United States Patent [19]

Maheshwari

[11] Patent Number: 4,494,165
[45] Date of Patent: Jan. 15, 1985

[54] FILAMENT COMPOSITE STRUCTURES PROVIDING LIGHTNING STRIKE AND ELECTROMAGNETIC PROTECTION

[75] Inventor: Mahendra Maheshwari, Lincoln, Nebr.

[73] Assignee: Brunswick Corporation, Skokie, Ill.

[21] Appl. No.: 206,479

[22] Filed: Nov. 13, 1980

[51] Int. Cl.³ ................... H02G 15/08; H05F 1/02
[52] U.S. Cl. .................... 361/117; 361/212; 361/218
[58] Field of Search ........... 361/117, 217, 218, 212, 361/215

[56] References Cited

U.S. PATENT DOCUMENTS

| | | | |
|---|---|---|---|
| 2,938,821 | 5/1960 | Nack | 228/117 |
| 3,086,902 | 4/1963 | Mager | 65/3.31 |
| 3,091,561 | 5/1963 | Marzocchi et al. | 428/294 |
| 3,288,175 | 11/1966 | Valko | 361/212 |
| 3,755,713 | 8/1973 | Paszkowski | 361/218 |
| 3,758,329 | 11/1973 | Garick | 427/175 |
| 3,958,066 | 5/1976 | Imamura et al. | 361/212 |
| 3,989,984 | 11/1976 | Amason et al. | 361/117 |
| 4,237,514 | 12/1980 | Cline | 361/218 |
| 4,330,811 | 5/1982 | Bordner | 361/212 |

OTHER PUBLICATIONS

Bigg, D. M., "Conductive Polymeric Compositions", *Polymer Engineering and Science*, vol. 17, No. 12, Dec. 1977, pp. 842-847.

*Primary Examiner*—G. Z. Rubinson
*Assistant Examiner*—L. C. Schroeder
*Attorney, Agent, or Firm*—John R. Hoffman

[57] ABSTRACT

In a laminated structure, such as a structural component of an aerospace vehicle or the like, which is fabricated of layers of filament composite material, means is provided for protection against lightning strike damage and electromagnetic interference. In particular, the outer surface layer of the filament composite material is fabricated of conductive metallic-coated filaments to provide a conductive barrier to disperse the current from lightning or other electromagnetic sources. The filaments may be fabricated of a composite material such as glass which has an aluminum coating. The structure may be woven or filament wound with intermixed resin, and the metallic-coated filaments are cured simultaneously with the entire laminated structure of filament composite material.

19 Claims, 7 Drawing Figures

U.S. Patent  Jan. 15, 1985  Sheet 1 of 2  4,494,165
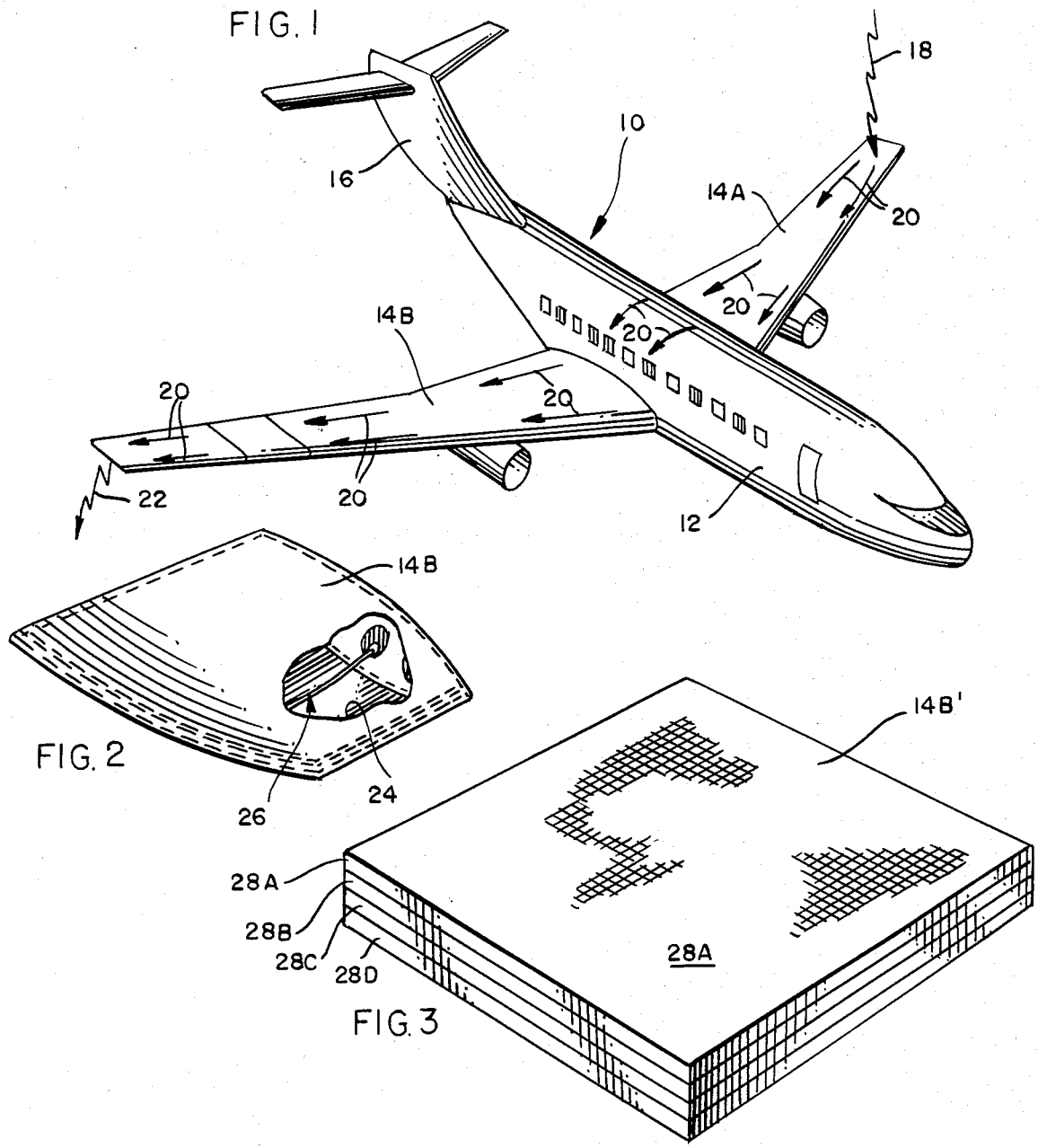

FILAMENT COMPOSITE STRUCTURES PROVIDING LIGHTNING STRIKE AND ELECTROMAGNETIC PROTECTION

BACKGROUND AND SUMMARY OF THE INVENTION

The present invention relates to laminated structures, and particularly to such structures which are fabricated of layers of filament composite material.

Fiber reinforced composite materials, such as filament woven or wound laminates, are replacing metal materials in many areas such as aerospace applications due to their excellent structural performance and low fabrication costs. In aerospace applications, filaments fabricated of glass composite materials considerably reduce the weight of structural components in vehicles where metallic materials are predominant. Such lightweight composite materials offer such advantages to aircraft designers, for instance, and their use is expected to increase dramatically simply as increased confidence in their reliability is established. However, problems are associated with such composite materials due to their vulnerability to lightning strike damage and electromagnetic interference. Consequently, there is a need to provide filament reinforced composite materials which can withstand lightning strikes or shield internal components from electromagnetic interference.

The conductivity of some composite materials, such as graphite, is sufficient in certain low order applications, but, in general, the conductivity of such materials is insufficient to combat lightning strike damage or to shield against high electromagnetic interference.

Attempts have been made to provide filament reinforced composite materials with the electrical conductivity which is prevalent with metal materials presently used for structural components, such as in the aerospace industry. For instance, some techniques employed to achieve a conductive surface have included painting the surface with a metal-based paint, bonding metal foil to the surface, flame-spraying metallic coatings, using metal wire mesh layers, and incorporation of metal strips or studs in the structural component. However, all of these attempts to provide a conductive media in a composite structure require secondary or additional operations resulting in higher costs of the respective structure.

The present invention is directed to solving the above described problems and to satisfy the need of providing a conductive media in composite structures to provide a structure with protection against lightning strike damage, electromagnetic interference.

In general, the present invention contemplates a composite structure, such as a structural component in an aerospace vehicle, which is fabricated of non-metallic filament laminates, with certain of the filaments coated with a conductive metal, such as aluminum, which will provide a conductive media. The coated filaments are intermixed with resin and are cured simultaneously with the entire structure resulting in superior structural performance and lower cost.

In particular, the present invention contemplates a laminated structure, such as a structural component of an aerospace vehicle or the like, which is fabricated of layers of filament composite material. The outer surface layer of the filament composite material is fabricated of conductive metallic-coated filaments to provide protection against lightning strike damage and electromagnetic interference. The outer surface layer of coated filaments provides a conductive barrier to disperse the current from lightning or other electromagnetic sources. Preferably, one or more outer surface layers are fabricated of the coated filaments, but not the entire thickness of the filament composite material comprising the structural component.

In the preferred embodiment of the invention, the filaments are fabricated of a composite material such as glass, or Kevlar, and the filaments are coated with an aluminum material. It is contemplated that the laminated structure may be filament wound with the outer surface layer thereof being wound with the conductive metallic-coated filaments. The laminated structure and outer surface layer also may be fabricated in a woven fashion. A wide variety of patterns of filament or fiber content for the laminated structure is contemplated, with the outer surface layer thereof fabricated of the conductive metallic-coated filaments. The entire composite structure, including the outer surface layer of coated filaments, can be intermixed or impregnated with epoxy resin, and the entire laminated structure can be cured simultaneously. This eliminates any secondary or additional operations which is prevalent with prior attempts to provide a conductive media in a filament composite structure.

Other objects, advantages and features of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of an aircraft, illustrating a lightning strike path between opposite wing tips thereof;

FIG. 2 is an enlarged, fragmented view of one wing tip of the aircraft of FIG. 1, with a portion thereof broken away to illustrate interior components thereof;

FIG. 3 is an enlarged section of the wing structure of FIG. 2 to illustrate the laminated or layered structure thereof;

FIG. 4 is an enlargement of the outer surface layer of the laminated structure of FIG. 3, illustrating the woven pattern thereof;

DETAILED DESCRIPTION OF THE INVENTION

Figure 5:
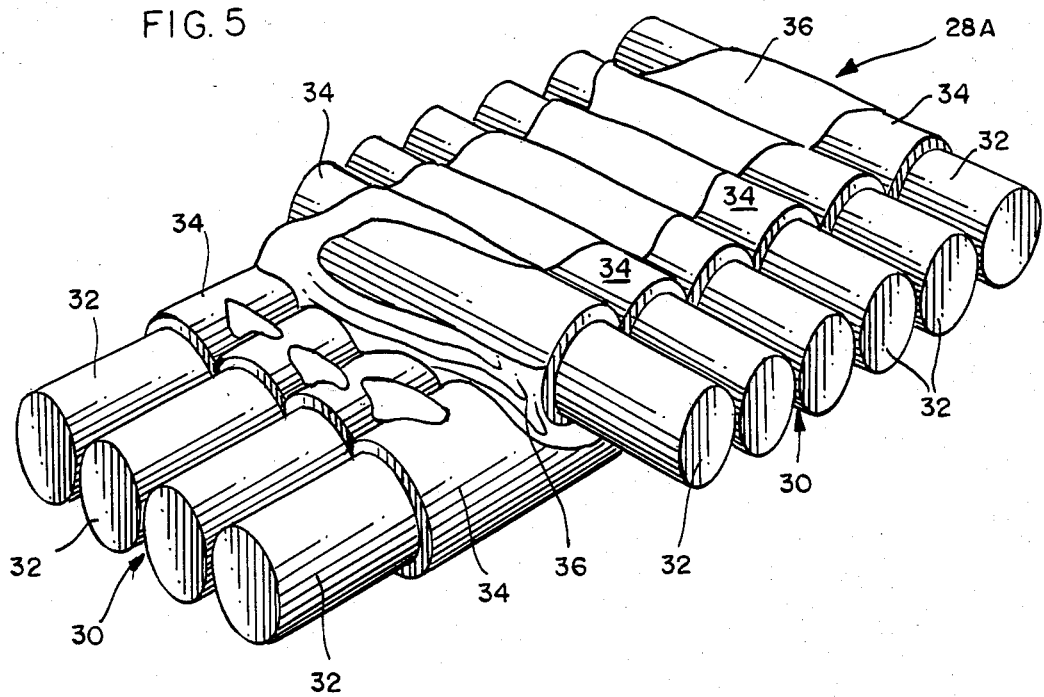
FIG. 5 is still a further enlargement showing a plurality of coated filaments in accordance with the present invention, as in the pattern of FIG. 4.

Referring to the drawings in greater detail, and first to FIG. 1, an aerospace vehicle is shown in the form of an aircraft, generally designated 10. The aircraft includes a fuselage 12, a pair of wings 14A and 14B, and a rear fin 16. One of the problems to which the present invention is directed is protection against lightning strike damage to structural components, such as those of aircraft 10. As shown, a bolt of lightning is indicated at 18 as striking the tip of wing 14A. As indicated by arrows 20, current from the lightning strike is dispersed across the wing, as well as fuselage 12 and the opposite wing 14B, and is shown dissipating into the atmosphere, as at 22.

At this point, it should be understood that the present invention is shown herein, particularly in relation to FIG. 1, for use in structural components of aerospace vehicles, such as aircraft 10, for illustration purposes only. The present invention has a wide range of applications in countless areas of structural components where conductive barriers might be required in filament composite structures, including but not limited to protection against lightning strike damage and electromagnetic interference, or the like.

Referring to FIG. 2, the tip of wing 14B is shown with a cut-out section 24 to illustrate that the wing contains certain interior components 26. Of course, this is equally true of fuselage 12, and it is important to protect interior components in a wide variety of applications from electromagnetic interference. Wing 14B may be fabricated of various patterns of layers of filament composite material such as woven patterns or filament wound patterns, the latter comprising helical or hoop filament windings. Such filament wound composite structures would be readily applicable for aircraft fuselage and wing components. Filament wound structures have received wide acceptance in the missile and rocket technologies.

FIG. 3 shows a section 14B′ which has been cut therefrom, as at 24 in FIG. 2. This section illustrates the laminated construction of the structural component as fabricated of a plurality of layers 28A–28D of filament composite material. Each layer may be fabricated by a wide variety of filament patterns, such as woven or wound patterns. The filaments of each layer 28A–28D are intermixed and/or impregnated with epoxy resin, and when the entire composite structure is either filament wound or laid up to a desired thickness, the entire structure is cured in known fashion, resulting in a lightweight structural component with superior structural performance and much lower cost than present metal structures.

FIG. 4 shows a single layer of the filament composite material, such as outer surface layer 28A, which comprises a woven-pattern layer including a plurality of bands or patterns 30 of individual filaments.

Referring to FIG. 5, it can be seen that each band or pattern 30 (FIG. 4) of filaments comprising outer surface layer 28 includes individual filaments. In accordance with the present invention, each filament is coated with a conductive metallic material to provide a composite conductive barrier to disperse current from lightning or other electromagnetic sources and thereby provide protection against lightning strike damage and electromagnetic interference. More particularly, each filament is fabricated of a composite material or core 32 of glass, Kevlar, or like material. The core is coated with a metallic coating 34 of aluminum, or other suitable metal. In this manner, the entire outer surface layer 28A of the composite structural component, such as wing 14B, provides a conductive barrier to disperse the current from lightning or electromagnetic sources. This is indicated by the lightning dispersion capability described above and shown in FIG. 1. The outer surface layer 28A, along with the entire thickness of the composite structure, is intermixed or impregnated with epoxy resin 36 (FIG. 5). Thus, by forming the resulting barrier as an integral part of the composite structure, and curing this outer layer or conductive surface simultaneously with the entire structure, all of the additional or secondary operations which heretofore have been required in providing a conductive media in composite structures are eliminated. Should fuselage 12 of aircraft 10 be fabricated similar to the wing 14B described in relation to FIGS. 2–5, a barrier is provided against electromagnetic interference with the delicate instruments within the fuselage or cockpit.

Figure 6A:
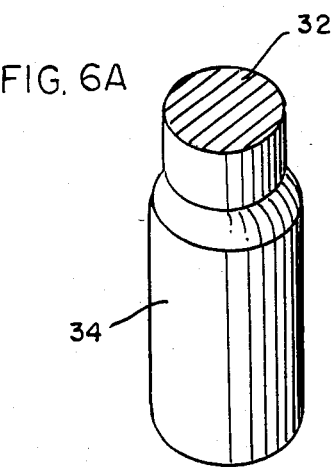
FIG. 6A illustrates a section of a single filament which is fully coated with a metallic material.
Figure 6B:
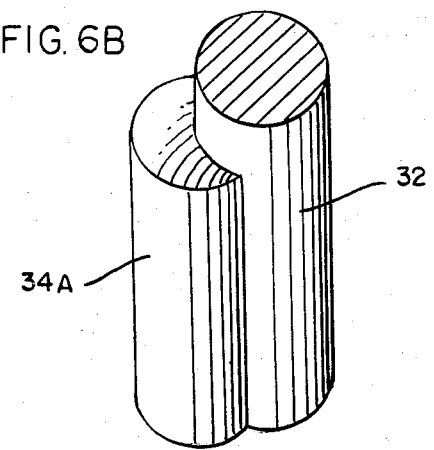
FIG. 6B illustrates a section of a single filament which is half coated with a metallic material.

Referring to FIGS. 6A and 6B, enlarged sections of lengths of a single metallic-coated filament are shown with different coating configurations. In particular, FIG. A shows a section of a single filament which includes the composite core 32 of glass, Kevlar or like material which is completely coated thereabout by coating 34 of aluminum or other conductive metallic material. FIG. 6B shows core 32 half coated, as at 34A, with the aluminum or other conductive metallic material.

Preferably, one or more of the outer surface layers, such as layer 28A, are fabricated of the coated filaments, but not the entire thickness of the filament composite material comprising the structural component. This arrangement is preferable because, otherwise, the cost of the structural component would be increased dramatically, but the structural performance of the structure would be reduced. A composite structure of glass, Kevlar, or like filaments has considerably greater strength than one fabricated entirely of metallic coated filaments.

The present invention has been tested and has proven effective in simulated lightning strike tests. In particular, lightning flashes are of two fundamentally different forms: cloud-to-ground flashes and intra-cloud flashes. Because of the difficulty of intercepting and measuring intra-cloud flashes, most available statistical data on the characteristics of lightning refer to cloud-to-ground flashes. Since intra-cloud flashes lack the high peak currents of cloud-to-ground flashes, the use of cloud-to-ground lightning strike characteristics actually is a conservative measuring criteria. There also can be discharges from either a positive or a negative charge center in a cloud. A negative discharge is characterized by several intermittent strokes and continuing currents, whereas a positive discharge, which occurs only a small percentage of the time, is characterized by a single stroke and continuing diminishing current. Laminated structures fabricated of outer layers of conductive metallic-coated filaments in accordance with the present invention, have proven quite effective in dispersing the simulated lightning strike current. Yet, additional or secondary operations, such as the use of metal-based paints, bonded metal foil, metal wire mesh, sprayed metal powders, or metal strips and studs, have been eliminated by fabricating the outer surface layer of conductive metallic-coated filaments as an integral part of the composite structure.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

What is claimed is:

1. A single, fully integrated laminated structure providing protection against lightning strike damage and electromagnetic interference, said structure comprising a lower area fabricated of filament composite material and only a surface area fabricated entirely of metallic-coated filaments, both areas and each area with the other being intermixed with epoxy resin, said structure being integrally formed in one piece by simultaneous curing of the whole integrated structure, said surface area providing a conductive barrier to disperse the current from lightning strike and electromagnetic sources.

2. A laminated structure as set forth in claim 1, wherein said filaments are fabricated of a composite material comprising glass.

3. A laminated structure as set forth in claim 2, wherein said filaments are coated with an aluminum material.

4. A laminated structure as set forth in claim 1 wherein said surface area is wound of metallic-coated filaments.

5. A laminated structure as set forth in claim 4, wherein said filaments are fabricated of a composite material comprising glass.

6. In a laminated structure as set forth in claim 4, wherein said filaments are coated with an aluminum material.

7. A laminated structure as set forth in claim 1, wherein said surface area of metallic-coated filaments comprises a woven layer.

8. A laminated structure as set forth in claim 1, wherein said filaments are coated with an aluminum material.

9. In an aerospace vehicle, a single, fully integrated structural element providing protection against lightning strike damage and electromagnetic interference, said structural element comprising a lower area fabricated of filament composite material and only a surface area fabricated entirely of metallic-coated filaments, both areas and each area with the other being intermixed with epoxy resin, said structural element being integrally formed in one piece by simultaneous curing of the whole integrated structural element, said surface area providing a conductive barrier to disperse the current from lightning strike and electromagnetic sources.

10. In an aerospace vehicle as set forth in claim 9, wherein said filaments are fabricated of a composite material comprising glass.

11. In an aerospace vehicle as set forth in claim 10, wherein said filaments are coated with an aluminum material.

12. In an aerospace vehicle as set forth in claim 9, wherein said structural component is filament wound and the surface area thereof is wound of said conductive metallic-coated filaments.

13. In an aerospace vehicle as set forth in claim 12, wherein said filaments are fabricated of a composite material comprising glass.

14. In an aerospace vehicle as set forth in claim 13, wherein said filaments are coated with an aluminum material.

15. In an aerospace vehicle as set forth in claim 9, wherein said surface area of metallic-coated filaments comprises a woven layer.

16. In an aerospace vehicle as set forth in claim 9, wherein said filaments are coated with an aluminum material.

17. In a laminated structure fabricated of layers of filament composite material and providing protection against lightning strike damage and electromagnetic interference, the improvement comprising only an outer surface layer fabricated entirely of metallic-coated filaments, both the outer surface layer and the lower layers and each layer with the other being intermixed with resin, and the outer surface layer being cured at the same time as the lower layers so that said outer surface layer is fully structurally integrated with said lower layers of filament composite material.

18. In a laminated structure as set forth in claim 17, wherein said outer surface layer of metallic-coated filaments comprises a wound layer.

19. In a laminated structure as set forth in claim 17, wherein said outer surface layer of metallic-coated filaments comprises a woven layer.

* * * * *